United States Patent

Ervens et al.

Patent Number: 6,041,893
Date of Patent: Mar. 28, 2000

[54] BRAKE JAW

[75] Inventors: Ludwig Ervens, Odenthal; Pedro Jose Lopez-Florez, Burscheid; Wolfgang Hoffrichter, Cologne; Ronald Huener, Leverkusen, all of Germany

[73] Assignee: Textar GmbH, Leverkussen, Germany

[21] Appl. No.: 08/992,508

[22] Filed: Dec. 17, 1997

[30] Foreign Application Priority Data

Dec. 19, 1996 [DE] Germany .................. 196 52 778

[51] Int. Cl.$^7$ .................. F16D 69/00; F16D 65/092
[52] U.S. Cl. .................. 188/1.11 W; 188/73.37; 188/250 E; 188/251 A
[58] Field of Search .................. 188/73.37, 250 E, 188/1.11 W, 1.11 R, 251 A, 251 M, 251 R; 192/107 C, 107 M, 107 R, 30 W, 30 V; 340/454, 453; 116/208

[56] References Cited

U.S. PATENT DOCUMENTS

| 4,256,801 | 3/1981 | Chuluda . | |
|---|---|---|---|
| 5,407,036 | 4/1995 | Hummel et al. | 188/250 E |
| 5,460,250 | 10/1995 | Lotfipour | 188/251 A |
| 5,662,192 | 9/1997 | Kingston et al. | 188/1.11 W |

FOREIGN PATENT DOCUMENTS

| 159976 | 8/1952 | Australia | 188/1.11 W |
|---|---|---|---|
| 0621414 | 10/1990 | European Pat. Off. . | |
| 0687829 | 12/1995 | European Pat. Off. . | |
| 0747610 | 12/1996 | European Pat. Off. . | |
| 1059532 | 3/1954 | France . | |
| 2052021 | 2/1984 | France . | |
| 1555973 | 10/1970 | Germany . | |

*Primary Examiner*—Douglas C. Butler
*Attorney, Agent, or Firm*—Diller, Ramik & Wight, PC

[57] ABSTRACT

In a brake jaw consisting of a lining support member (2) and a friction lining (4), an intermediate layer (6, 8) arranged between the friction lining (4) and the lining support member (2) and acting as a damping layer to avoid squealing caused by friction, it is provided that the intermediate layer (6, 8) consists of a material mixture that is adapted to damp friction squealing during braking and to generate an acoustic alarm signal when reaching the wear limit.

3 Claims, 1 Drawing Sheet

BRAKE JAW

BACKGROUND OF THE INVENTION

The present invention refers to a brake jaw. Brake jaws are known that comprise a lining support member and a friction lining, as well as an intermediate layer arranged between the friction lining and the lining support and acting as a damping layer to avoid squealing caused by friction. Using such an intermediate layer can damp resonant vibrations occurring when braking. Such a damping layer is known, for example, from EP-A-0 621 414.

Further, it is known to provide electric or mechanic wear indicators in brake systems. Since such systems comprise only one wear indicator per caliper, it may happen that the lining support member of one friction lining already contacts the brake disc, while, on the side having the wear indicator, the friction lining is not yet worn down enough to cause an alarm.

Besides the great structural effort for such wear indicators, there is another problem in that such wear indicator means cannot be retrofit.

SUMMARY OF THE INVENTION

It is an object of the present invention to provide a brake jaw of the type mentioned above, which allows for a low cost wear indication and may be retrofit in every car.

The present invention advantageously provides that the intermediate layer arranged between the friction lining and the lining support consists of a material mixture that is adapted, on the one hand, to damp friction squealing during braking and, on the other hand, to generate an acoustic alarm signal when reaching the wear limit.

Such a brake jaw can be used in any car without requiring any restructuring of the car. The intermediate layer simultaneously functions to dampen friction squealing during braking and to generate an acoustic alarm signal when reaching the wear limit, so the driver is caused to have the brake system checked.

Preferably, the intermediate layer causes an acoustic alarm signal made up by structure-borne noises. Such low frequency noises can clearly be heard inside a vehicle even when the interior of the car is well insulated.

The composition of the intermediate layer may be such that a sound is generated that becomes ever louder with increasing wear of the intermediate layer.

The intermediate layer may consist of the following material mixture (amounts in percent by weight):

| resins | 0–40%, preferably 5–15% |
| --- | --- |
| elastomers | 0–40%, preferably 5–15% |
| metals | 0–60%, preferably 25–40% |
| fibers | 0–40%, preferably 15–25% |
| fillers | 2–80%, preferably 20–30%. |

The intermediate layer may be composed of two separate subsequent layers so that the friction lining is first followed by a layer generating the acoustic alarm signal and then by a layer damping friction squealing and being adjacent to the lining support.

As an alternative, the intermediate layer can be structured such that the friction lining is first followed by the layer damping friction squealing and then by a layer generating the acoustic alarm signal and being adjacent the lining support.

The layer generating the acoustic alarm signal preferably has the following composition in percent by weight:

| resins | approx. 5–30% |
| --- | --- |
| elastomers | approx. 2–5% |
| metals | approx. 10–30% |
| fibers | approx. 1–10% |
| fillers | approx. 30–60%. |

The layer damping the friction squealing preferably has the following composition in percent by weight:

| resins | 2–25% |
| --- | --- |
| elastomers | 20–40% |
| metals | 0–20% |
| fibers | 0–30% |
| fillers | 10–40% |
| anticorrosive agents | 0–2%. |

As the noise generating fillers, for example, light metal oxides are used, in particular calcinated aluminum oxides, heavy metal oxides, silicates, ores, cokes and/or anorganic fibers.

Preferably, the noise generating fillers are added as solid particles with a particle size in the range from about 10 to 300 μm.

BRIEF DESCRIPTION OF THE DRAWINGS

The following is a detailed description of embodiments of the invention taken in conjunction with the accompanying drawings.

In the Figures.

DETAILED DESCRIPTION OF PREFERRED EMBODIMENTS

Figure 1:
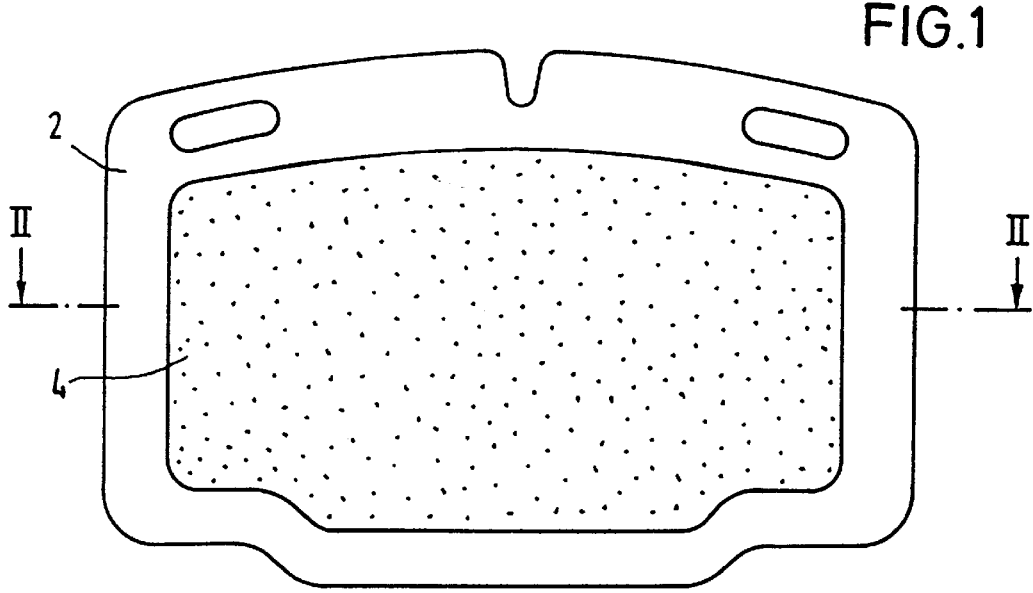
FIG. 1 is a view of a brake jaw for a disc brake.

The brake jaw for a disc brake with partial lining, illustrated in FIG. 1, comprises a lining support plate 2, onto which an intermediate layer 6, and a friction lining 4 are adhered.

The intermediate layer 6, 8 may be prefabricated as a prepressed plate so as to be pressed onto the lining support plate 2 together with the friction material of the friction lining.

Alternatively, it is also possible to introduce the material mixture of the intermediate layer 6, 8 into the press mold as a homogenous mixture or in a certain sequence and to subsequently press it together with the friction material of the friction lining. Here, the intermediate layer also functions as an adhesive that connects the friction lining 4 with the lining support plate 2.

With the friction lining adhered thereto, the intermediate layer 6, 8 has the function to reduce or eliminate friction squealing as a damping element.

When the friction lining 4 is worn, the intermediate layer 6, 8 generates an acoustic alarm signal indicating the wear condition of the brake jaw to the driver. The acoustic alarm signal is generated by the friction film between the brake jaw or the brake drum being broken and by purposefully generating vibrations that are within the structure-borne noise range. Such low frequency noises are advantageous in that they are transmitted well into the vehicle even when the interior thereof is well insulated, while they cannot be heard outside the vehicle.

It is an advantage of such an intermediate layer which simultaneously damps friction squealing and generates an acoustic alarm signal when reaching the wear limit that complex wear indicator means are no longer required. In particular, it is advantageous in that such an intermediate layer may be used in any brake jaw so that such a wear indicator means may be retrofit in all types of vehicles. For example, the material mixture of the intermediate layer 6, 8 has the composition indicated in the following table:

| Contents | Example | % by weight | | Preferably |
| --- | --- | --- | --- | --- |
| | | min | max | |
| resin | phenolic resin, epoxy resin | 0 | 40 | 5–15 |
| elastomer | NBR, SBR, IR silicone rubber | 0 | 40 | 5–15 |
| metals | brass chips, steel wool | 0 | 60 | 25–40 |
| fibers | mineral fibers, organic fibers | 0 | 40 | 15–25 |
| fillers | powdered minerals, alumina | 2 | 80 | 20–30 |

The thickness of the intermediate layer is about 2 to 4 mm. An integral intermediate layer having both functions is preferred.

Alternatively, the intermediate layer may be made of two parts, where, preferably, the friction lining 4 is followed by the intermediate layer 8 generating an acoustic alarm signal when reaching the wear limit, which in turn is followed by a layer 6 damping the friction squealing and being adjacent the lining support member 2.

The composition of the noise-generating intermediate layer 8 can be seen from the following table:

| | |
| --- | --- |
| rubber | 2–5% by weight |
| resins | 5–30% by weight |
| fibers | 1–10% by weight |
| fillers | 30–60% by weight |
| metals | 10–30% by weight. |

The intermediate layer 6 used as a damper element has the following composition:

| | |
| --- | --- |
| rubber | 20–40% by weight |
| resins | 2–25% by weight |
| fibers | 0–30% by weight |
| anticorrosive agents | 0–2% by weight |
| fillers | 10–40% by weight. |

In the intermediate layer 6 serving as a damper element, the Young's modulus has to be greater than that of the friction lining 4. This is achieved by a high percentage of rubber.

The frictional behavior of both intermediate layers 6, 8 is designed such that they can at least fulfill emergency braking functions.

Particularly suitable for generating noises in the intermediate layer 6, 8 are the following fillers:
light metal oxides, such as aluminum oxides
in particular calcinated aluminum oxides
e.g.: polishing alumina
  Bikorit
heavy metal oxides
e.g.: iron oxides
  chrome oxides
  zirconium oxides
silicates
e.g.: aluminum silicates (corundum)
  zirconium silicates
  quartz
ores
e.g.: chrome iron ore
cokes
fibers
e.g.: synthetic mineral fibers
  glass fibers The average grain size of the noise-generating particles is about 120 $\mu$m, but it may be in the range from 10 to 300 $\mu$m, i.e. powdered to coarse grained. The intensity of the noise may be influenced through the amount of noise-generating particles in the intermediate layer.

Figure 2:
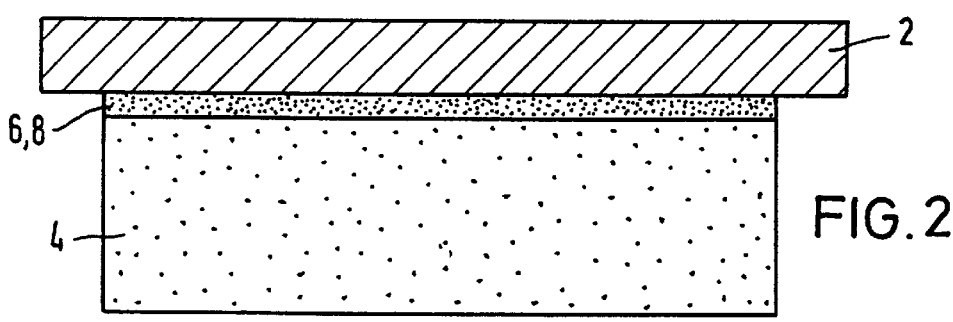
FIG. 2 is a section along line II—II.
Figure 3:
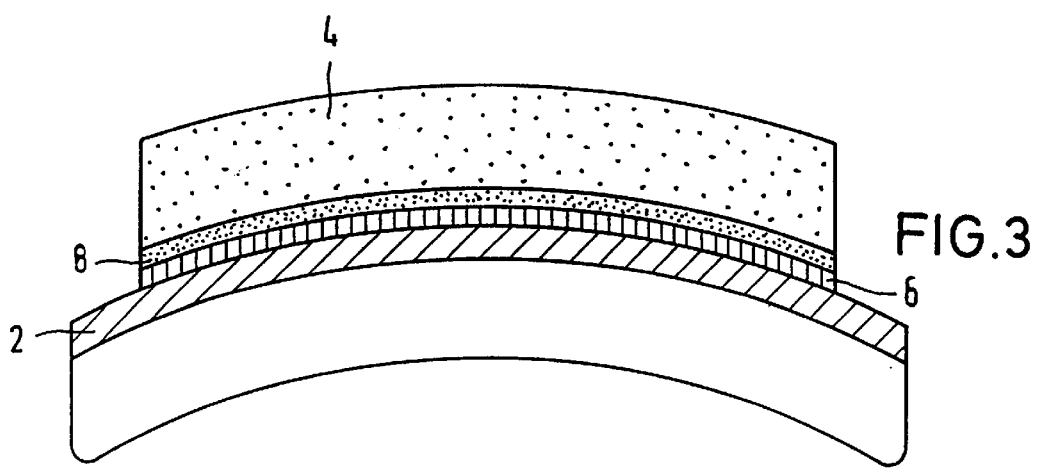
FIG. 3 is a side elevational view of a brake jaw for a drum brake.

Whereas FIG. 2 illustrates a brake jaw for a disk brake that has an integral intermediate layer 6, 8, FIG. 3 illustrates a brake jaw for a drum brake having a two-part intermediate layer, wherein the layer 8 generating the alarm signal is arranged above the layer 6 damping the friction squealing.

We claim:

1. A brake pad comprising a support plate (2), a friction lining (4) and an intermediate layer (6, 8) bonded between said support plate (2) and said friction lining (4); said intermediate layer (6, 8) including material composition means for damping friction squealing during braking and for generating an acoustic alarm signal upon the friction lining (4) reaching the wear limit, and said intermediate layer (6,8) being separate layer portions (6 and 8) bonded to each other with one of said layer portions (6) including said material composition means for damping friction squealing and another of said layer portions (8) including said material composition means for generating the acoustic alarm signal.

2. A brake pad comprising a support plate (2), a friction lining (4) and an intermediate layer (6, 8) bonded between said support plate (2) and said friction lining (4); said intermediate layer (6, 8) including material composition means for damping friction squealing during braking and for generating an acoustic alarm signal upon the friction lining (4) reaching the wear limit, and said intermediate layer (6,8) being separate layer portions (6 and 8) bonded to each other with one of said layer portions (6) including said material composition means for damping friction squealing and another of said layer portions (8) including said material composition means for generating the acoustic alarm signal, and said one (6) and another (8) layer portions are bonded respectively to said support plate (2) and to said friction lining (4).

3. A brake pad comprising a support plate (2), a friction lining (4) and an intermediate layer (6, 8) bonded between said support plate (2) and said friction lining (4); said intermediate layer (6, 8) including material composition means for damping friction squealing during braking and for generating an acoustic alarm signal upon the friction lining (4) reaching the wear limit, and said intermediate layer (6,8) being separate layer portions (6 and 8) bonded to each other with one of said layer portions (6) including said material composition means for damping friction squealing and another of said layer portions (8) including said material composition means for generating the acoustic alarm signal, and said one (6) and another (8) layer portions are bonded respectively to said friction lining (4) and to said support plate (2).

* * * * *